(12) United States Patent
Sugiyama (10) Patent No.: US 12,230,952 B2
(45) Date of Patent: Feb. 18, 2025

(54) ELECTRICAL CABLE FIXING JIG AND VEHICLE

(71) Applicant: TOYOTA JIDOSHA KABUSHIKI KAISHA, Toyota (JP)

(72) Inventor: Reona Sugiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 18/200,233

(22) Filed: May 22, 2023

(65) Prior Publication Data

US 2024/0055845 A1 Feb. 15, 2024

(30) Foreign Application Priority Data

Aug. 15, 2022 (JP) .................................. 2022-129253

(51) Int. Cl.
  *F16L 3/127* (2006.01)
  *B60R 16/02* (2006.01)
  *H02G 3/32* (2006.01)
(52) U.S. Cl.
  CPC ........... *H02G 3/32* (2013.01); *B60R 16/0215* (2013.01)
(58) Field of Classification Search
  CPC ......... H02G 3/32; H02G 3/02; B60R 16/0215
  See application file for complete search history.

(56) References Cited

U.S. PATENT DOCUMENTS

| | | | | |
|---|---|---|---|---|
| 3,186,051 | A * | 6/1965 | Waddell | F16L 3/222 248/68.1 |
| 7,520,474 | B1 * | 4/2009 | Condon | F16L 3/243 248/300 |
| 8,267,357 | B2 * | 9/2012 | Kataoka | B61D 49/00 248/68.1 |
| 10,060,557 | B2 * | 8/2018 | Cox | F16L 5/14 |
| 11,189,997 | B2 * | 11/2021 | Yang | B60K 7/0007 |
| 11,365,831 | B2 * | 6/2022 | Juzak | F16L 55/035 |
| 11,639,759 | B2 * | 5/2023 | Itokazu | H02G 3/32 248/68.1 |
| 2005/0029005 | A1 | 2/2005 | Arai et al. | |
| 2019/0039747 | A1 * | 2/2019 | Gilbertson | F16L 3/222 |
| 2021/0088157 | A1 * | 3/2021 | Itokazu | H02G 3/32 |
| 2023/0070605 | A1 * | 3/2023 | Geens | H02G 3/32 |

FOREIGN PATENT DOCUMENTS

JP 2005-057968 A 3/2005

\* cited by examiner

*Primary Examiner* — Amy J. Sterling
(74) *Attorney, Agent, or Firm* — Dinsmore & Shohl LLP (57) ABSTRACT

A protector includes an electrical cable fixing portion, in which an electrical cable insertion hole is provided, and a pair of plate portions that is provided on each of one side and another side of the electrical cable fixing portion in an X direction. Each of the plate portions is provided with a through hole into which a bolt for fastening the protector to a predetermined member is inserted along a Z direction. A greatest value of a width of the through hole provided in each of the plate portions in a Y direction is larger than a greatest value of a width in the X direction.

12 Claims, 5 Drawing Sheets

ELECTRICAL CABLE FIXING JIG AND VEHICLE

CROSS-REFERENCE TO RELATED APPLICATION

This application claims priority to Japanese Patent Application No. 2022-129253 filed on Aug. 15, 2022, incorporated herein by reference in its entirety.

BACKGROUND

1. Technical Field

The present disclosure relates to an electrical cable fixing jig and a vehicle.

2. Description of Related Art

A harness fixing protector, disclosed in Japanese Unexamined Patent Application Publication No. 2005-57968 (JP 2005-57968 A), for example, includes a base and a cover. Both sides of the base are provided with fixing portions for fixing to an object to which the base is to be attached. A harness insertion groove for fixing the harness, and a harness insertion space for movably inserting the harness, are provided between the fixing portions on both sides. One of the fixing portions is provided with a round hole into which a stud bolt is inserted. The other of the fixing portions is provided with a slot into which a stud bolt is inserted.

SUMMARY

In the aforementioned JP 2005-57968 A, one fixing portion is provided with the round hole into which the stud bolt is inserted, as described above. Accordingly, movement of the stud bolt inserted into the round hole is restricted by an inner peripheral face of the round hole. Thus, it may conceivably be difficult to fasten the stud bolt when there is misalignment between an insertion hole for the stud bolt formed in the object to which the base is to be attached, and the round hole of the fixing portion. Hence, there is a demand for a protector that can more reliably fasten the harness fixing protector (electrical cable fixing jig) to a member to which the base is to be attached.

The present disclosure provides an electrical cable fixing jig that can be more reliably fastened to a member to which attachment is to be performed, and a vehicle that enables the electrical cable fixing jig to be more reliably fastened to the member to which attachment is to be performed.

A first aspect of the present disclosure relates to an electrical cable fixing jig having an electrical cable insertion hole through which an electrical cable is inserted. The electrical cable fixing jig includes a first portion that has the electrical cable insertion hole, and a pair of second portions that are provided on each of one side and another side of the first portion in a first direction orthogonal to an insertion direction into the electrical cable insertion hole. Each of the second portions has a first fastening member insertion hole. A first fastening member that is configured to fasten the electrical cable fixing jig to a predetermined first member is inserted into the first fastening member insertion hole along a second direction that is orthogonal to each of the insertion direction and the first direction. A greatest value of a width of the first fastening member insertion hole provided in each of the second portions in the insertion direction is larger than a greatest value of a width in the first direction.

According to the electrical cable fixing jig of the first aspect as described above, the greatest value of the width in the insertion direction of the first fastening member insertion hole provided in each of the second portions is larger than the greatest value of the width in the first direction. Accordingly, a position of the first fastening member inserted into the first fastening member insertion hole can be adjusted in the insertion direction, in each of the second portions. As a result, both of the second portions can be easily fastened to the predetermined first member. Thus, the electrical cable fixing jig can be more reliably fastened to the predetermined first member.

In the electrical cable fixing jig of the first aspect, a shape of the first fastening member insertion hole that each of the second portions has may be an elongated-circle shape. According to the electrical cable fixing jig of the first aspect as described above, the position of the first fastening member can be easily adjusted along a longitudinal direction of the first fastening member insertion hole that has an elongated-circle shape.

In the electrical cable fixing jig of the first aspect, a shape of the first fastening member insertion hole that each of the second portions has may be a rectangular shape. According to the electrical cable fixing jig of the first aspect as described above, the position of the first fastening member can be easily adjusted along the longitudinal direction of the first fastening member insertion hole that has a rectangle shape.

In the electrical cable fixing jig of the first aspect, a pair of third portions that is provided on each of the one side and the other side of the first portion in the first direction may further be included. Each of the third portions may have a second fastening member insertion hole, in which a second fastening member that is configured to fasten the electrical cable fixing jig to a predetermined second member is inserted, along the insertion direction. According to the electrical cable fixing jig of the first aspect as described above, there is no need to separately provide a jig provided with the second portions and a jig provided with the third portions, and accordingly increase in the number of parts can be suppressed. Further, the electrical cable fixing jig can be fastened using the second fastening member in addition to the first fastening member (in a direction different from that of the first fastening member).

In the electrical cable fixing jig configured as described above, a shape of the second fastening member insertion hole may be a perfect circular shape. According to the electrical cable fixing jig configured as described above, the second fastening member insertion hole and the first fastening member insertion hole can be easily distinguished. As a result, workers can be suppressed from mistaking the direction of fastening the electrical cable fixing jig.

In the electrical cable fixing jig configured as described above, a shape of the second fastening member insertion hole may be an elongated-circle shape or a square shape. According to the electrical cable fixing jig configured as described above, the second fastening member insertion hole and the first fastening member insertion hole can be easily distinguished. As a result, workers can be suppressed from mistaking the direction of fastening the electrical cable fixing jig.

In the electrical cable fixing jig configured as described above, each of the third portions may include a first plate member that extends orthogonally to the insertion direction. According to the electrical cable fixing jig configured as described above, thickness of each of the third portions in the insertion direction can be made to be relatively small. As a result, size of the electrical cable fixing jig can be easily reduced.

In the electrical cable fixing jig configured as described above, each of the second portions may include a second plate member extending orthogonally to the second direction. On each of the one side and the other side of the first portion, the first plate member and the second plate member may be provided continuously with each other. According to the electrical cable fixing jig configured as described above, distance (amount of space) between the first plate member and the second plate member can be reduced as compared with when the first plate member and the second plate member are apart from each other. As a result, the size of the electrical cable fixing jig can be reduced even further. Moreover, space (region) occupied by disposing the electrical cable fixing jig can be reduced.

A second aspect of the present disclosure relates to a vehicle that includes a vehicle body, and an electrical cable fixing jig having an electrical cable insertion hole through which an electrical cable that is routed along in the vehicle body is inserted. The electrical cable fixing jig includes a first portion that has the electrical cable insertion hole, and a pair of second portions provided on each of one side and another side of the first portion in a first direction orthogonal to an insertion direction into the electrical cable insertion hole. Each of the second portions has a fastening member insertion hole, in which a fastening member that is configured to fasten the electrical cable fixing jig to a predetermined member of the vehicle body is inserted, along a second direction that is orthogonal to each of the insertion direction and the first direction. A greatest value of a width of the fastening member insertion hole in the insertion direction is larger than a greatest value of a width in the first direction.

In the vehicle according to the second aspect of the present disclosure as described above, the greatest value of the width in the insertion direction of the fastening member insertion hole provided in each of the second portions is larger than the greatest value of the width in the first direction. Accordingly, a vehicle can be provided in which the electrical cable fixing jig can be more reliably fastened to the predetermined member.

According to the present disclosure, the electrical cable fixing jig can be fastened to the member on the object of fastening more reliably.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings. The same or corresponding parts in the drawings are denoted by the same signs, and repetitive description will be omitted.

Figure 1:
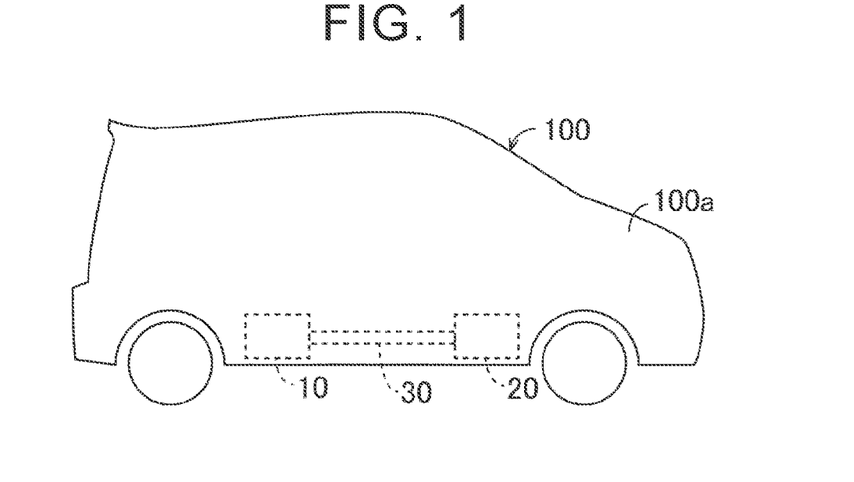
FIG. 1 is a schematic diagram illustrating a configuration of a vehicle according to an embodiment that is an example of the present disclosure.

FIG. 1 is a schematic diagram illustrating a configuration of a vehicle 100 according to the present embodiment. The vehicle 100 includes a vehicle body 100a. The vehicle 100 also includes first electrical equipment 10, second electrical equipment 20, and electrical cables 30. Each of the first electrical equipment 10 and the second electrical equipment 20 is provided in vehicle body 100a. The electrical cables 30 are routed along the vehicle body 100a. The electrical cables 30 electrically connect the first electrical equipment 10 and the second electrical equipment 20.

Figure 2:
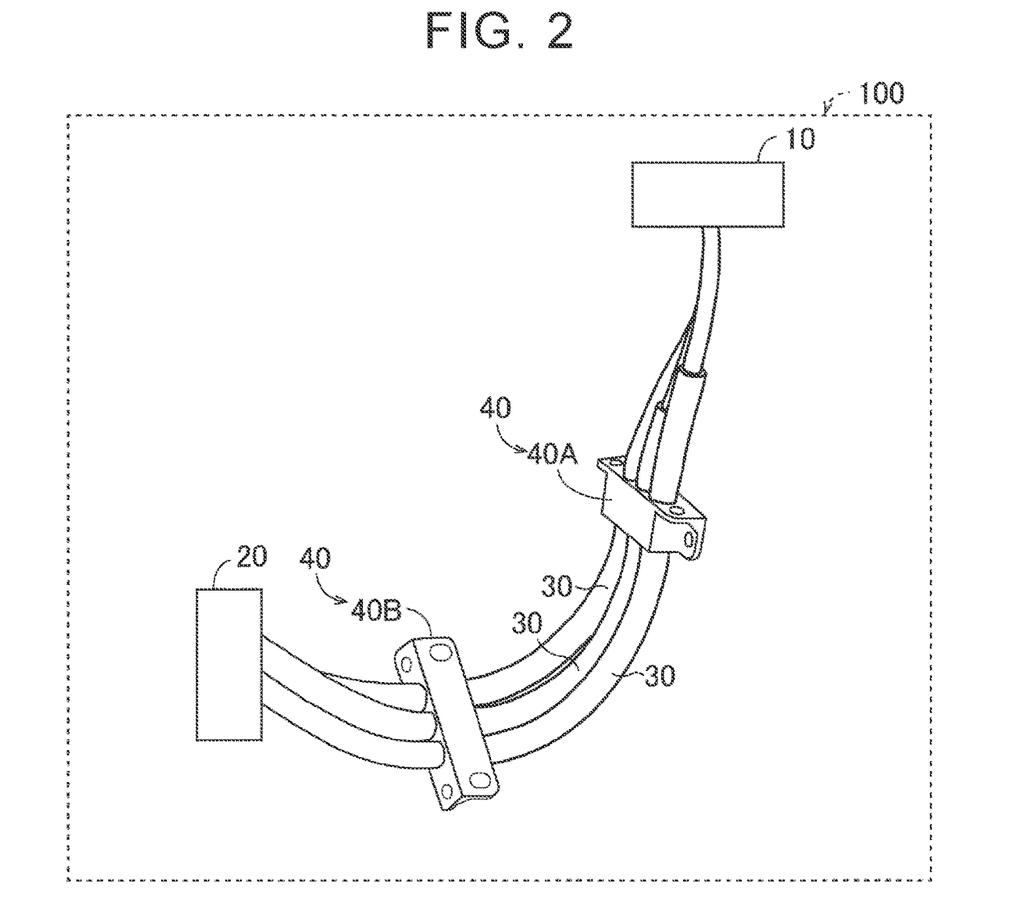
FIG. 2 is a perspective view illustrating electrical cables and a protector in the vehicle according to the embodiment.

As illustrated in FIG. 2, in the vehicle 100, three electrical cables 30 (for three phases) are routed along in parallel with each other.

Figure 9:
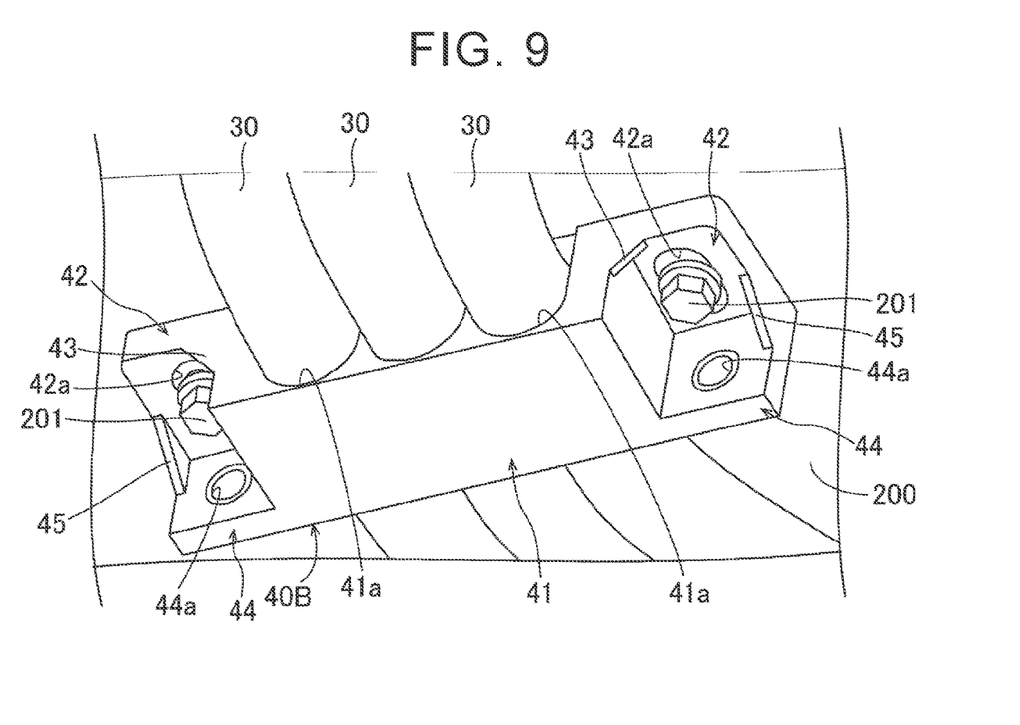
FIG. 9 is a perspective view illustrating the protector in FIG. 2.

The vehicle 100 includes a protector 40. The protector 40 is provided to fix the electrical cables 30 to members of the vehicle body 100a (a member 200 and a member 300, which will be described later, see FIGS. 9 and 10). The vehicle 100 includes two protectors 40 (40A and 40B). The configurations of the protectors 40A and 40B are the same as each other. Note that the protectors 40 are made of resin. Also, the protectors 40 (40A, 40B) are an example of "electrical cable fixing jig" according to the present disclosure.

Figure 3:
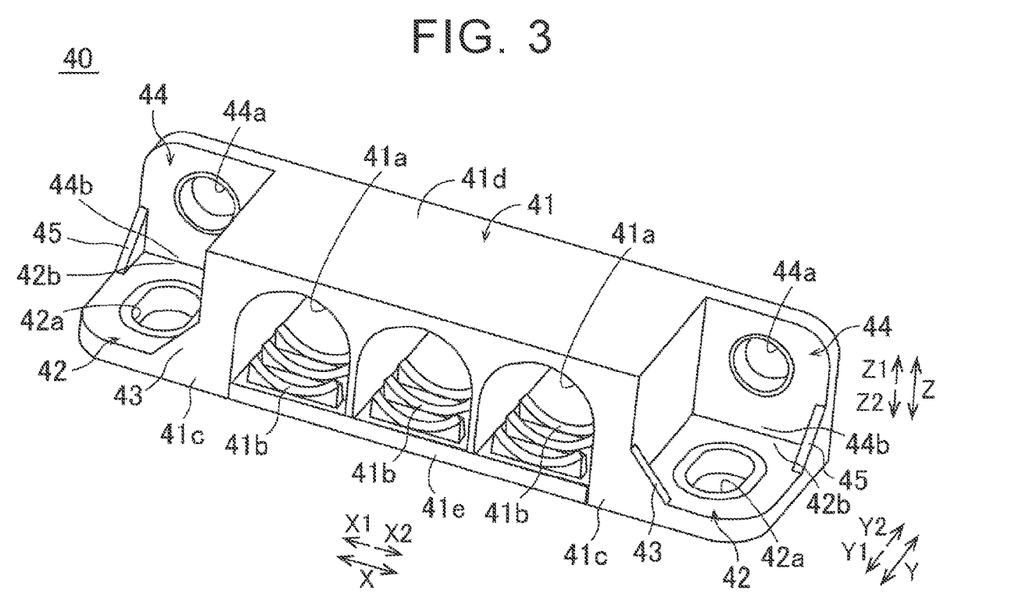
FIG. 3 is a perspective view illustrating a configuration of the protector according to the embodiment.

As illustrated in FIG. 3, the protector 40 includes an electrical cable fixing portion 41 provided with electrical cable insertion holes 41a through which the electrical cables 30 are inserted. The electrical cable fixing portion 41 fixes the electrical cables 30 inserted through the electrical cable insertion holes 41a. Note that the electrical cable fixing portion 41 is an example of "first portion" according to the present disclosure.

Three electrical cable insertion holes 41a are provided in the electrical cable fixing portion 41 so as to correspond to the three electrical cables 30. The three electrical cable insertion holes 41a are provided adjacent to each other along an X direction. The electrical cables 30 are inserted through the electrical cable insertion holes 41a along a Y direction that is perpendicular to the X direction. Note that the X direction is an example of "first direction" according to the present disclosure, and the Y direction is an example of "insertion direction" according to the present disclosure.

Inside of the electrical cable insertion holes 41a are provided holding portions 41b for holding the electrical cables 30, which are round cables (wiring with circular cross sections). The holding portions 41b have curved shapes that follow outer surfaces of the electrical cables 30. Note that the holding portions 41b are provided in a cover portion 41e, which will be described later.

The protector 40 also includes a pair of plate portions 42 provided on each of one side (X1 side) and the other side (X2 side) of the electrical cable fixing portion 41 in the X direction. Each of the plate portions 42 is provided so as to extend orthogonally to a Z direction. Note that the Z direction is a direction orthogonal to both of the X direction and the Y direction. Also, the plate portions 42 are an example of "second plate member" and also "second portion" according to the present disclosure. Moreover, the Z direction is an example of "second direction" according to the present disclosure.

Each plate portion 42 is provided with a through hole 42a. Bolts 201 (see FIG. 9) for fastening the protector 40 (40B) to the member 200 (e.g., a case accommodating an inverter or the like of the vehicle 100) of the vehicle body 100a are inserted into the through holes 42a. The bolts 201 (see FIG. 9) are inserted into through holes 42a along the Z direction. Note that the member 200 includes a case or the like that accommodates electrical equipment, circuits, and so forth, provided in the vehicle 100. Also, the through holes 42a are an example of "first fastening member insertion hole" and "fastening member insertion hole" according to the present disclosure. Also, the bolts 201 are an example of "first fastening member" and "fastening member" according to the present disclosure. Also, the member 200 is an example of "predetermined member" and "predetermined first member" according to the present disclosure.

Each of the plate portions 42 is integrally formed with the electrical cable fixing portion 41 (a portion of the electrical cable fixing portion 41 included in a base portion 41d, which will be described later). Each of the plate portions 42 is provided so as to extend along the X direction from an end portion 41c of the electrical cable fixing portion 41 on a Z2 side thereof.

A reinforcing portion 43 that is plate-like in form is provided between each of the plate portions 42 and the electrical cable fixing portion 41. Each of the plate portions 42 is stably (strongly) fixed to the electrical cable fixing portion 41 by the reinforcing portion 43. Note that the reinforcing portions 43 are provided so as to connect end portions of the electrical cable fixing portion 41 and the plate portions 42 on a Y1 side thereof to each other.

Referencing FIG. 3 again, the protector 40 also includes a pair of plate portions 44 provided on each of one side (X1 side) and the other side (X2 side) of the electrical cable fixing portion 41 in the X direction. Each of the plate portions 44 is provided so as to extend orthogonally to the Y direction. Note that the plate portions 44 are an example of "first plate member" and also "third portion" according to the present disclosure.

Each plate portion 44 is provided with a through hole 44a. Bolts 301 (see FIG. 10) for fastening the protector 40 (40A) to the member 300 (see FIG. 10) of the vehicle body 100a are inserted into the through holes 44a. The bolts 301 are inserted into the through holes 44a along the Y direction. Note that the member 300 includes a case or the like that accommodates electrical equipment, circuits, and so forth, provided in the vehicle 100. Also, the through holes 44a are an example of "second fastening member insertion hole" according to the present disclosure. Also, the member 300 and the bolts 301 respectively are examples of "predetermined second member" and "second fastening member" according to the present disclosure.

As illustrated in FIG. 3, the plate portions 42 and the plate portions 44 are provided so as to be continuous with each other on each of the one side (X1 side) and the other side (X2 side) of the electrical cable fixing portion 41 in the X direction. Specifically, end portions 44b on the Z2 side of the plate portions 44 and end portions 42b on a Y2 side of the plate portions 42 are connected to each other. Note that the plate portions 44 are formed integrally with the plate portions 42. That is to say, the plate portions 42 and the plate portions 44 are each integrally formed with the electrical cable fixing portion 41 (a portion of the electrical cable fixing portion 41 included in the base portion 41d, which will be described later).

Reinforcing portions 45 that are plate-like in form are provided between the plate portions 42 and the plate portions 44 that are continuous with each other. The plate portions 44 are stably (strongly) fixed to the plate portions 42 by the reinforcing portions 45. Note that the reinforcing portions 45 are provided so as to connect the plate portions 42 and the plate portions 44 to each other, at the end portions thereof on opposite sides from the electrical cable fixing portion 41.

Now, in a conventional protector, when there is misalignment between a fastening hole formed in the object to which the protector is to be attached and a fastening hole (circular hole) of the protector, there are cases in which fastening the protector to the object to which the protector is to be attached by a stud bolt is difficult. Accordingly, there is demand for fastening the protector to the object to which the protector is to be attached more reliably.

Figure 4:
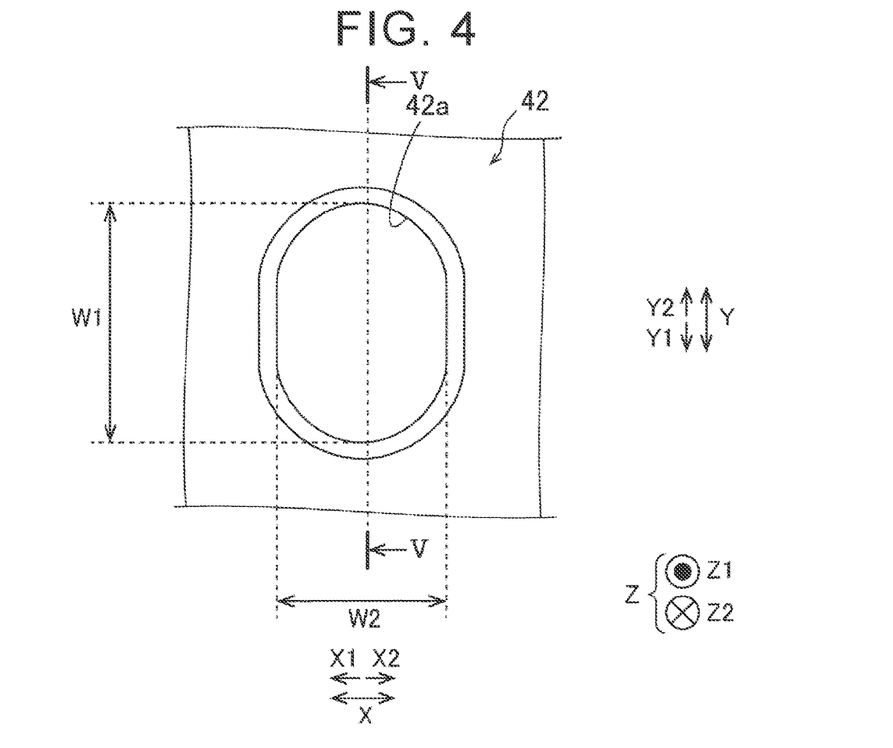
FIG. 4 is a front view of a through hole that has an elongated-circle shape, according to the embodiment.

Now, in the present embodiment, the through hole 42a provided in each of the plate portions 42 has a width W1 (inner diameter) in the Y direction that is larger than a width W2 (inner diameter) in the X direction, as illustrated in FIG. 4. The through holes 42a have a greatest value of the width W1 in the Y direction that is larger than a greatest value of the width W2 in the X direction. Note that the width W1 is greatest at the center of the through hole 42a in the X direction. Also, the width W2 is greatest at the center of the through hole 42a in the Y direction.

Figure 5:
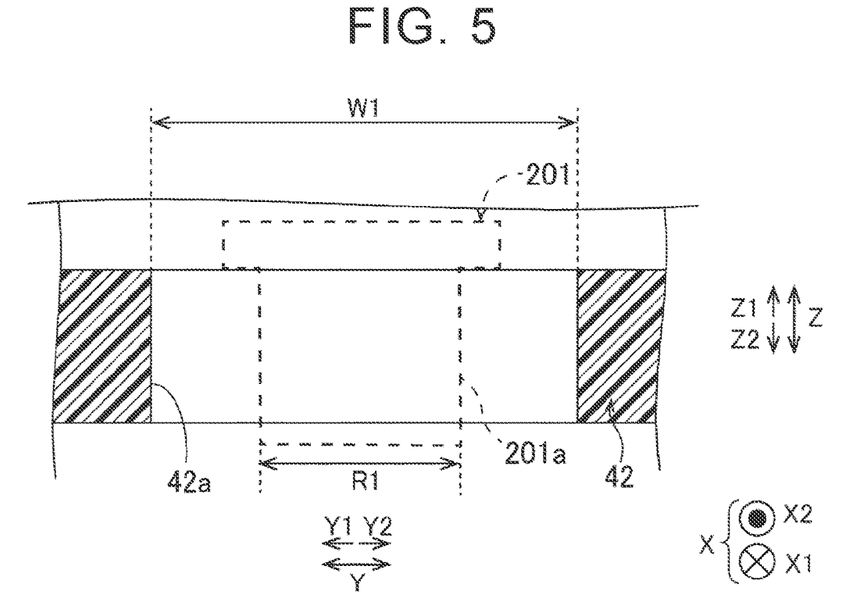
FIG. 5 is a sectional view taken along line V-V in FIG. 4.

The width W1 is greater than a sum of tolerance of the electrical cable 30 and a diameter R1 (see FIG. 5) of a bolt portion 201a of the bolt 201 (see dashed line in FIG. 5). Accordingly, the tolerance of the electrical cable 30 can be accommodated by the through hole 42a (the effects of the tolerance can be mitigated), and reaction force of the electrical cable 30 can be mitigated. Note that the width W2 is larger than the diameter R1 of the bolt 201 and smaller than the above sum.

Moreover, the through hole 42a has an elongated-circle shape (elliptical shape). Specifically, the through hole 42a has a circular shape in which, as viewed along the Z direction, the Y direction is a longitudinal direction and the X direction is a lateral direction.

Also, as illustrated in FIG. 5, the through hole 42a is provided so as to extend along the Z direction without being inclined with respect to the Z direction.

Figure 6:
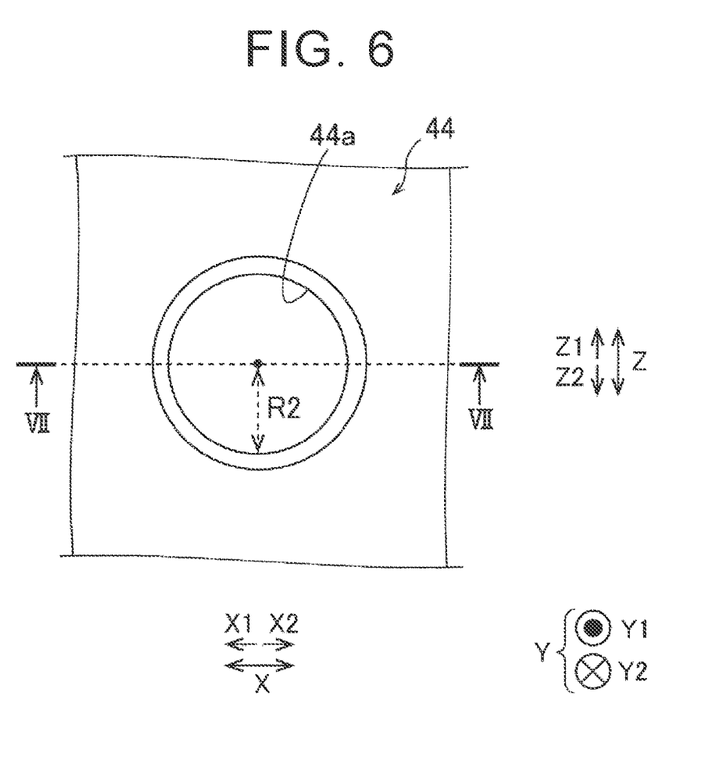
FIG. 6 is a front view of a through hole that has a perfect circular shape, according to the embodiment.

Further, as illustrated in FIG. 6, the through hole 44a provided in each of the plate portions 44 has a perfect circular shape. The through hole 44a has a circular shape with a radius R2, as viewed along the Y direction. Note that a diameter (2×R2) of the through hole 44a is substantially equal to the width W2 (see FIG. 4) of the through hole 42a.

Figure 7:
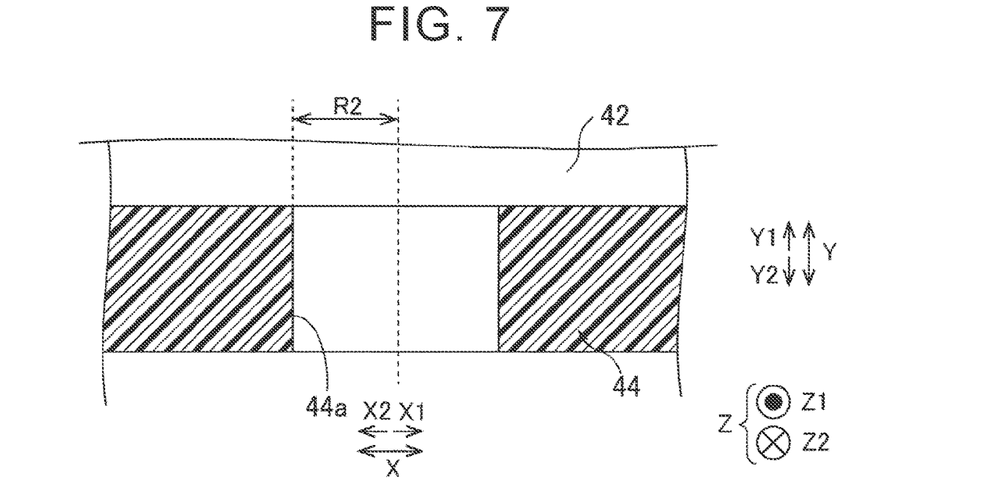
FIG. 7 is a cross-sectional view taken along line VII-VII in FIG. 6.

Also, as illustrated in FIG. 7, the through hole 44a is provided so as to extend along the Y direction without being inclined with respect to the Y direction.

Figure 8:
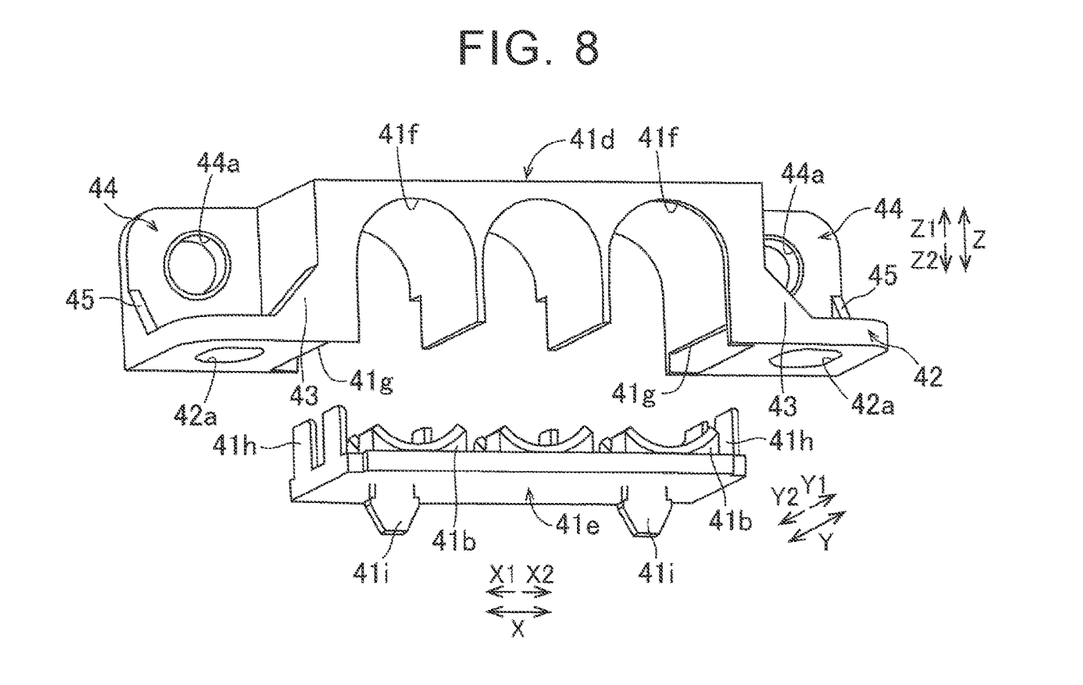
FIG. 8 is a disassembled perspective view of the protector according to the embodiment.

Moreover, as illustrated in FIG. 8, the protector 40 includes the base portion 41d and the cover portion 41e. The base portion 41d is provided with a plurality of notch portions 41f that make up the electrical cable insertion holes 41a (see FIG. 3). A plurality of the electrical cable insertion holes 41a is formed by closing (blocking) an open side of each of the notch portions 41f by the cover portion 41e.

Also, two fitting holes 41g are provided in the base portion 41d. Further, claw portions 41h projecting toward the fitting holes 41g are provided at both ends of the cover portion 41e in the X direction. The cover portion 41e is fixed to the base portion 41d by fitting the claw portions 41h into the fitting holes 41g.

Also, two protruding portions 41i that protrude in the Z2 direction are provided on an end face of the cover portion 41e on the Z2 side.

Note that the plate portions 42 and the plate portions 44 are each included in the base portion 41d.

Figure 10:
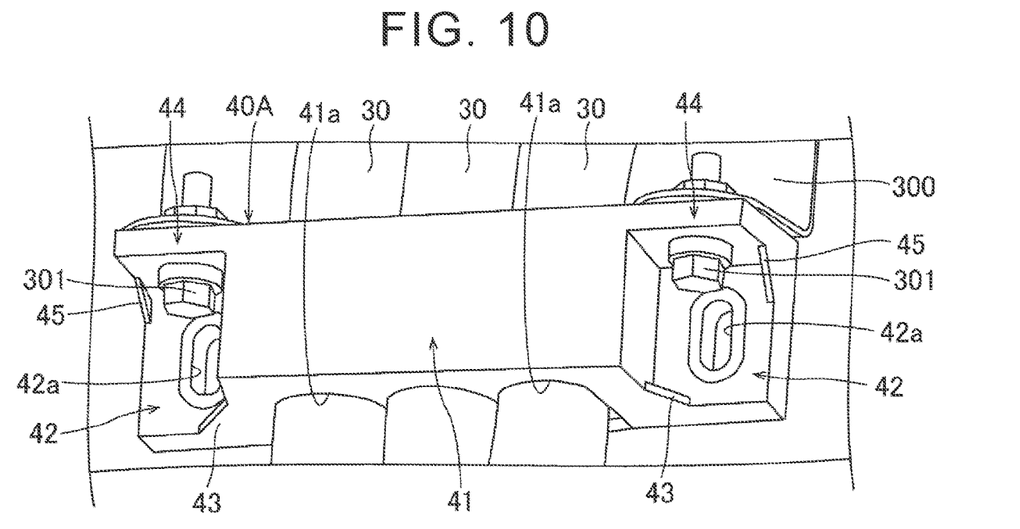
FIG. 10 is a perspective view illustrating the protector in FIG. 2.

In some embodiments, in the manufacturing process of the vehicle 100, the electrical cables are assembled to the protector 40B (see FIG. 9) after the electrical cables 30 are assembled to the protector 40A (see FIG. 10). Accordingly, fastening using the through holes 42a capable of accommodating the tolerance of the electrical cables 30 is performed after fastening using the through holes 44a. As a result, the reaction force that is applied to the electrical cables 30 in an extending direction of the electrical cables 30, due to the tolerance of the electrical cables 30, can be effectively mitigated.

As described above, according to the present embodiment, in the through hole 42a provided in each of the plate portions 42, the greatest value of the width W1 in the insertion direction (Y direction) is larger than the greatest value of the width W2 in the X direction. Thus, the amount of positional adjustment in the insertion direction of the bolts 201 in the through holes 42a can be made to be relatively large.

Although an example has been described in the above embodiment in which the protector 40 includes the plate portions 44, the present disclosure is not limited to this. An arrangement may be made in which the protector 40 does not have the plate portions 44.

Also, an example in which the protector 40A and the protector 40B are fastened to different members (200 and 300) from each other has been described in the above embodiment, but the present disclosure is not limited to this. The protector 40A and the protector 40B may be fastened to a common member.

Also, an example in which the through holes 44a have perfect circular shapes is described in the above embodiment, but the present disclosure is not limited to this. The through holes 44a may have elongated-circle shapes. Alternatively, the through holes 44a may have, for example, square shapes.

Further, an example in which the plate portions 42 and the plate portions 44 are provided continuously with each other is described in the above embodiment, but the present disclosure is not limited to this. The plate portions 42 and the plate portions 44 may be separated from each other, without being provided continuously.

Further, an example in which the through holes 42a have elongated-circle shapes as viewed along the Z direction is described in the above embodiment, but the present disclosure is not limited to this. The through holes 42a may have, for example, rectangular shapes as viewed along the Z direction.

The embodiment disclosed herein shall be construed as exemplary in all respects and not restrictive. The scope of the present disclosure is set forth by the claims rather than by the above description of the embodiment, and is intended to include all modifications within the meaning and scope equivalent to those of the claims.

What is claimed is:

1. An electrical cable fixing jig having an electrical cable insertion hole through which an electrical cable is inserted, the electrical cable fixing jig comprising:

a first portion that has the electrical cable insertion hole; and a pair of second portions that are provided on each of one side and another side of the first portion in a first direction orthogonal to an insertion direction into the electrical cable insertion hole, wherein each of the second portions has a first fastening member insertion hole, in which a first fastening member that is configured to fasten the electrical cable fixing jig to a predetermined first member is inserted into the first fastening member insertion hole along a second direction that is orthogonal to each of the insertion direction and the first direction, and a greatest value of a width of the first fastening member insertion hole provided in each of the second portions in the insertion direction is larger than a greatest value of a width in the first direction.

2. The electrical cable fixing jig according to claim 1, wherein a shape of the first fastening member insertion hole that each of the second portions has is an elongated-circle shape.

3. The electrical cable fixing jig according to claim 1, further comprising a pair of third portions that is provided on each of the one side and the other side of the first portion in the first direction, wherein each of the third portions has a second fastening member insertion hole, in which a second fastening member that is configured to fasten the electrical cable fixing jig to a predetermined second member is inserted, along the insertion direction.

4. The electrical cable fixing jig according to claim 3, wherein a shape of the second fastening member insertion hole is a perfect circular shape.

5. The electrical cable fixing jig according to claim 3, wherein a shape of the second fastening member insertion hole is an elongated-circle shape.

6. The electrical cable fixing jig according to claim 3, wherein each of the third portions includes a first plate member that extends orthogonally to the insertion direction.

7. The electrical cable fixing jig according to claim 6, wherein each of the second portions includes a second plate member extending orthogonally to the second direction, on each of the one side and the other side of the first portion, the first plate member and the second plate member are provided continuously with each other.

8. A vehicle comprising:

a vehicle body; and an electrical cable fixing jig having an electrical cable insertion hole through which an electrical cable that is routed along in the vehicle body is inserted, wherein the electrical cable fixing jig includes a first portion that has the electrical cable insertion hole, and a pair of second portions provided on each of one side and another side of the first portion in a first direction orthogonal to an insertion direction into the electrical cable insertion hole, each of the second portions has a fastening member insertion hole, in which a fastening member that is configured to fasten the electrical cable fixing jig to a predetermined member of the vehicle body is inserted, along a second direction that is orthogonal to each of the insertion direction and the first direction, and a greatest value of a width of the fastening member insertion hole in the insertion direction is larger than a greatest value of a width in the first direction.

9. The electrical cable fixing jig according to claim 1, wherein the first portion includes a base portion and a cover portion, with the cover portion fixed to the base portion.

10. The electrical cable fixing jig according to claim 9, wherein the base portion includes a fitting hole and the cover portion includes a claw portion projecting toward the fitting hole, with cover portion fixed to the base portion by fitting the claw portion into the fitting hole.

11. The vehicle according to claim 8, wherein the first portion includes a base portion and a cover portion, with the cover portion fixed to the base portion.

12. The vehicle according to claim 11, wherein the base portion includes a fitting hole and the cover portion includes a claw portion projecting toward the fitting hole, with cover portion fixed to the base portion by fitting the claw portion into the fitting hole.

\* \* \* \* \*